United States Patent [19]
Cassel

[11] 3,827,733
[45] Aug. 6, 1974

[54] PIPE COUPLING UNIT
[76] Inventor: Thomas R. Cassel, 226 Shirley, Birmingham, Mich. 48009
[22] Filed: June 29, 1972
[21] Appl. No.: 267,344

[52] U.S. Cl............. 285/382.2, 285/398, 285/424, 285/382.4, 403/285
[51] Int. Cl............................................. F16l 21/00
[58] Field of Search ..... 285/398, 397, 382.2, 382.4, 285/404, 173, 420, 424, 417, 371, 53, 330, 331, 382.2; 287/104, 110; 181/35 C, 36 B; 29/455, 523, 526

[56] References Cited
UNITED STATES PATENTS

| | | | |
|---|---|---|---|
| 658,493 | 9/1900 | Trigwell | 285/404 X |
| 1,197,858 | 9/1916 | Redmon | 285/398 X |
| 2,462,721 | 2/1949 | Cohen | 285/420 X |
| 2,814,508 | 11/1957 | Seamark | 285/371 X |
| 3,044,657 | 7/1962 | Horton | 285/398 X |
| 3,178,208 | 4/1965 | Koehler | 285/420 X |
| 3,327,945 | 6/1967 | Pfister | 285/420 X |
| 3,534,988 | 10/1970 | Lindsey | 285/382.4 X |
| 3,547,475 | 12/1970 | Gingher | 285/397 X |
| 3,572,778 | 3/1971 | Cassel | 285/382 |

FOREIGN PATENTS OR APPLICATIONS
1,381,496  11/1964  France.................................. 285/398

Primary Examiner—James R. Boler
Assistant Examiner—Wayne L. Shedd
Attorney, Agent, or Firm—Reising, Ethington and Perry

[57] ABSTRACT

A coupling device for pipes is disclosed which provides strong mechanical connection and fluid sealing without the requirement of close tolerances in the dimensions of the pipes to be connected. A coupling device comprises inner and outer sleeves with an annular space therebetween adapted to receive the end of a pipe to be joined. A coupling device may be double ended and adapted to accept a pipe to be joined at each end or it may be single ended and adapted to accept a pipe at one end only. Force exerting means suitably in the form of a threaded fastener coact with the inner sleeve for expanding at least a portion thereof radially whereby the end of a pipe inserted between the sleeves will be squeezed therebetween to form the joint.

11 Claims, 5 Drawing Figures

PATENTED AUG 6 1974 3,827,733

PIPE COUPLING UNIT

This invention relates to coupling devices and more particularly to pipe couplings.

There are many situations in which it is desirable to join a pipe end to another member or to another pipe end in a connection which is not only mechanically strong but also substantially fluid tight. A prime example is the exhaust system of automotive vehicles and it is for this application that the present invention has been especially devised. It will be appreciated, however, that the invention will be useful also in applications where fluid sealing is of no significance but where it is desired to provide a strong mechanical connection. A pipe coupling is already known which provides both fluid sealing and mechanical connection and which couples two pipe ends directly to each other in telescoping relation with the outer pipe being stretched about the inner pipe. This known coupling is in commercial use in automotive vehicle exhaust systems and is known as the "TORCA" joint and is also disclosed and claimed in U.S. Pat. No. 3,572,778 issued to Thomas R. Cassel. As fully set forth therein, two pipes are coupled together by inserting one within the other and at least the inner one is provided with an inwardly extending deformation adjacent the end. The inner pipe has a peripheral length which is equal to or greater than the peripheral length of the inner surface of the outer pipe and when the two pipes are drawn together in the vicinity of the deformation the inner pipe is placed in compression and the outer pipe is placed in tension. Fastening means such as a bolt extends between the pipes in the vicinity of the deformation and when tightened draws them together and holds them in the stressed condition to effect a fluid tight engagement over a wide band around the pipes in an exceedingly strong mechanical joint.

Other pipe couplings are known which are adapted for coupling two pipe ends together by means of a coupling unit which is disposed internally of the two adjoining pipe ends and is adapted to be expanded into tight engagement with the pipes to form a mechanical connection. Examples of this type of coupling are set forth in U.S. Pat. Nos. 2,192,048, 2,850,304, 2,997,317 and 3,514,135. Although the devices disclosed in such patents may be suitable for mechanical connection of pipes, they are not adapted for joining pipes which serve as fluid conduits and require fluid tight seals.

In accordance with the present invention, a pipe coupling is provided which is adapted to provide a strong mechanical connection and if desired a good fluid seal without the need for preforming the end of the pipe to be joined. This is accomplished by means of a separate coupling unit which receives the pipe end in an annular space and grips the pipe end in close fitting engagement on both inner and outer surfaces of the pipe wall over a wide band. This is achieved by a coupling device which comprises inner and outer sleeves with an annular space therebetween and adapted to receive the end of the pipe. Means are provided for expanding the inner sleeve in a radial direction so that the wall of the pipe end is squeezed between the sleeves.

Further, in accordance with this invention, a pipe coupling for both mechanical connection and fluid sealing is provided which does not require close tolerances to be maintained in the dimensions of the pipes to be connected. This is accomplished by a coupling device with inner and outer sleeves as just described wherein the inner sleeve in its free or relaxed condition fits loosely inside the pipe to be joined and the outer sleeve in its free or relaxed condition fits loosely over the pipe to be joined. The expansion of the inner sleeve when the joint is formed may be great enough to expand the pipe end into tight engagement with the outer sleeve; preferably, however, the sleeves of the coupling unit are adapted so that the inner sleeve is expanded into engagement with the inner surface of the pipe end while the outer sleeve is contracted or stretched about the outer surface of the pipe end. This action is achieved by means of an inwardly extending deformation in the inner sleeve, together with means for drawing the sleeves together in the vicinity of the deformation.

Additionally, in accordance with the invention, the coupling device may be designed and constructed in accordance with the particular type of application of installation in which it is to be used. As a separate coupling unit the inner and outer sleeves may be constructed of a material and with dimensions which are optimum for producing the desired compression and tension to form the joint.

In accordance with the invention, a pipe coupling device is provided which is of unusually simple and economical construction and especially adapted for ease of installation. It provides an exceedingly strong mechanical connection and a very good fluid seal with the pipe being joined. The coupling unit may be single ended, i.e., as a terminal pipe connection or it may be double ended, i.e., as for joining two pipes together. This is achieved by the combination of inner and outer sleeves defining an annular opening therebetween adapted to receive the end of a pipe with means coacting with the inner sleeve for expanding at least a portion thereof to squeeze the wall of the pipe between the sleeves. For a single ended coupling the sleeves may be mounted on some terminal device and adapted to receive a pipe at one end only. For a double ended coupling support means is disposed between the inner and outer pipes for holding them in spaced coaxial relation. Preferably the inner sleeve is formed with an inwardly extending deformation and fastener means extends through the sleeves in a radial direction to draw the sleeves together in the vicinity of the deformation to effect the desired expansion of the inner sleeve against the pipe end. The same drawing force tends to stretch the outer sleeve around the pipe end. For joining two pipes together two threaded fasteners may be employed and an elongated washer is disposed over the fasteners on the outer surface of the outer sleeve and the expansion and contraction of the sleeves is thereby distributed axially of the coupling. Desirably, the outer sleeve is circular in cross section and the inner sleeve is circular except for the deformation. The sleeves are advantageously formed of steel pipe and the support member therebetween may be formed with oppositely disposed protuberances in the inner wall of the outer sleeve. A predetermined orientation or rotative position of the pipe and coupling device is provided by indexing a notch in the end of the pipe wall with the shank of the fastener extending between the sleeves of the coupling unit.

A more complete understanding of this invention may be obtained from the detailed description which follows, taken with the accompanying drawings, in which.

Figure 1:
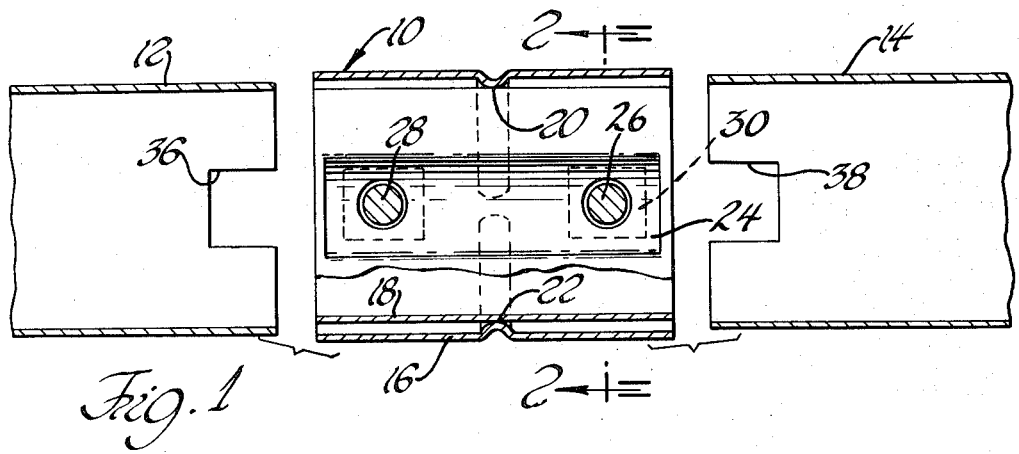
FIG. 1 is a view of a double ended coupling unit, partially in section and pipes to be joined thereby.

Referring now to the drawings, there is shown an illustrative embodiment of the invention in a coupling unit for pipes especially adapted for use in an automotive exhaust system. In such an application the pipe joints must provide good mechanical strength and good fluid seals. Further, the joints must be able to withstand the relatively high operating temperatures of the exhaust gases from an internal combustion engine. The pipes in an exhaust system are commonly formed as welded steel tubing of cold rolled sheet steel of about 18 gauge. However, such pipes may be of other material such as stainless steel. In any case the coupling unit of the present invention is preferably formed of steel pipe which may also be welded steel tubing of cold rolled sheet steel and of a gauge suitably related to that of the pipe to be joined.

As shown in FIG. 1, the coupling unit 10 is of the double ended type and is adapted to join the end of a pipe 12 with the end of a pipe 14. The coupling unit comprises an outer sleeve 16 suitably of circular cross section and having an inside diameter large enough to provide a loose fit with the pipes 12 and 14 respectively when they are inserted inside the sleeve 16. The coupling unit also comprises an inner sleeve 18 suitably of circular cross section and having an outside diameter which provides a loose fit with the pipes 12 and 14 respectively when inserted inside the pipes. In order to retain the inner sleeve 18 in spaced coaxial relationship with the outer pipe 16, support means are provided intermediate the ends thereof in the form of a pair of oppositely disposed circumferentially extending ribs or protuberances 20 and 22. In the illustrative embodiment the protuberances 20 and 22 are preferably formed integrally in the wall of the outer sleeve 16.

Figure 2:
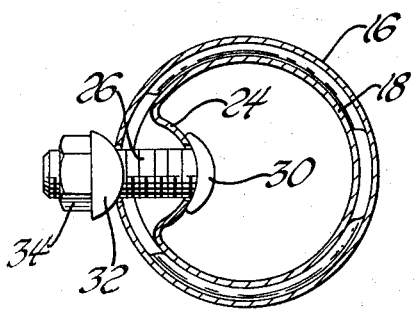
FIG. 2 is a view taken on lines 2—2 of FIG. 1.

The inner sleeve 18 is provided with a radially inwardly extending deformation 24 which suitably extends the full length of the inner sleeve 18. About midway between the protuberance 20 and the righthand end of the coupling unit fastening means in the form of a bolt 26 extends through an opening in the inner sleeve and an opening in the outer sleeve. Similarly, about midway between the protuberance 20 and the lefthand end of the coupling unit fastening means in the form of a bolt 28 extends through an opening in the inner sleeve and an opening in the outer sleeve. It is noted that the bolts 26 and 28 are of the same construction. Bolt 26 includes a head 30 which is seated against the inside surface of the deformation 24 and a shank which extends beyond the outer surface of the outer sleeve 16. The bolts 26 and 28 receive an elongated washer 32 which is disposed on the outside of the sleeve 16 and which has an inner surface configuration conforming to the configuration of the deformation 24. The bolt 26 receives a nut 34 and bolt 28 receives an identical nut outside the washer 32. The coupling unit 10 comprising the inner and outer sleeves is held in subassembly relationship as depicted in FIGS. 1 and 2 by means of the supporting protuberances 20 and 22 and by the loosely assembled bolts 26 and 28 and the respective nuts.

In use of the coupling unit 10 for joining two pipes such as 12 and 14 the ends of the pipes are inserted into the annular spaces defined by the inner and outer sleeves at opposite ends thereof. For the purpose of indexing the pipes 12 and 14 to a predetermined angular orientation relative to the coupling unit, the ends of the pipe 12 and 14 are provided with notches 36 and 38. The notch 36 is aligned with the bolt 28 and accommodates the shank thereof when the pipe 12 is inserted into the coupling unit. Similarly, the notch 38 is aligned with the bolt 26 and accommodates the shank thereof when the pipe is inserted into the other end of the coupling unit.

Figure 3:
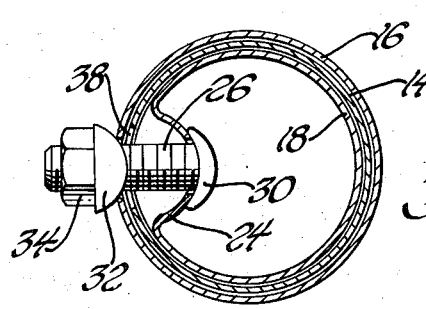
FIG. 3 shows the coupling unit and assembled pipe of FIG. 1 partially in section.
Figure 4:
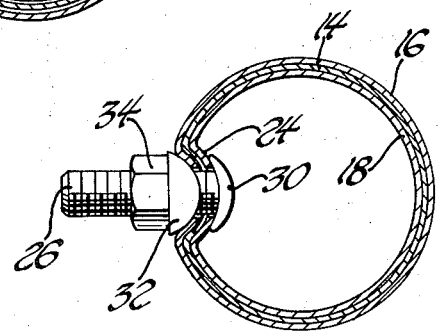
FIG. 4 shows the assembly of FIG. 3 in tightened condition.

With the pipes 12 and 14 inserted into the coupling unit the unit is ready for tightening to complete the formation of the joint. As shown in FIG. 3, the end of pipe 14 is loosely fitted inside the outer sleeve 16 and outside the inner sleeve 18. The end of pipe 12 is similarly situated relative to the other end of the coupling unit. The joint is completed by tightening the nuts onto the respective bolts 26 and 28. This may be accomplished by fully tightening one of the bolts and then the other, or alternatively, one bolt may be partially tightened and then the other partially tightened and so forth until both bolts are fully tightened. As the tightening of either bolt proceeds, the outer sleeve 16 and the inner sleeve 18 are drawn together in the vicinity of the deformation 24 and as a result the inner sleeve 18 is progressively enlarged in the radial direction throughout the circumference thereof over a relatively wide band at least commensurate with the axial length of the head of the respective bolts. At the same time, the outer sleeve 16, is to some degree at least, pulled into the deformation in the inner sleeve with the result that the outer sleeve is contracted in the radial direction over a wide band which is commensurate with the axial length of the washer 32. The enlargement of the inner sleeve and the contraction of the outer sleeve occur to some degree in every case with the amount thereof being dependent upon several factors including the material and gauge of the sleeve stock. The coupling unit may be designed to provide the desired relative yield between the inner and outer sleeves for a given pipe to be coupled thereby. The expansion of the inner sleeve and the contraction of the outer sleeve results in the squeezing or gripping of the end of the pipe 14 over a wide band, which extends around the entire circumference of the pipe. Consequently with the inner sleeve in compressive stress and the outer sleeve in tensile stress, the end of the pipe 14 is placed in radial compression. The relationship of the end of pipe 14 and the coupling unit in its fully tightened condition is shown in FIG. 4. The coupling unit thus provides a very strong mechanical connection with the pipe and a fluid tight seal between the end of the pipe and the sleeves of the coupling unit.

Figure 5:
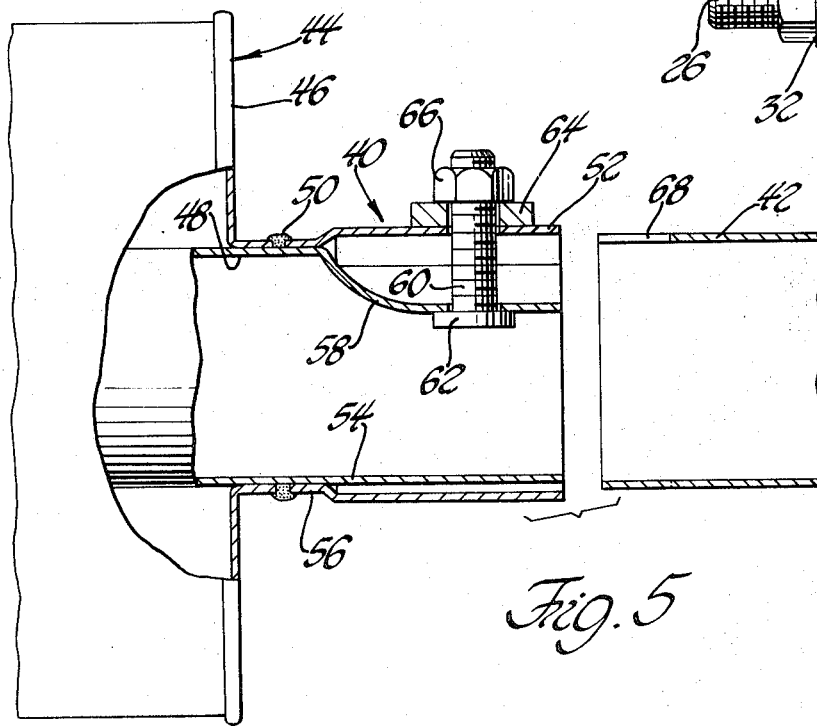
FIG. 5 is a view partially in section of a single ended coupling unit.

An embodiment of the invention in a single ended coupling unit is shown in FIG. 5. The single ended coupling unit is especially adapted for joining a pipe to some form of terminal device and the coupling unit may be constructed as a part of the terminal device itself. Referring now to FIG. 5, a coupling unit 40 is adapted to join a pipe 42 with a muffler 44 which may be regarded as a terminal device for the pipe 42. The muffler 44 includes a header 46 and an end fitting or pipe 48 which constitutes a gas flow conduit for the muffler. The pipe 48 extends beyond the header 46 and is joined thereto by a weld joint 50.

The coupling 40 comprises an outer sleeve 52 and an inner sleeve 54 which is formed of the outer end portion of the pipe 48. The outer sleeve 52 is disposed coaxially of the inner sleeve 54 and is retained in position by a support member in the form of a shouldered flange 56 which is secured to the inner sleeve 54 by the welded joint 50. The inner sleeve 54 has a cross sectional shape of circular or other regular configuration except for an inwardly disposed deformation 58 extending from the outer end thereof to the region of the flange 56. The outer sleeve 52 has a cross sectional shape which is of circular or other regular configuration throughout its periphery. The inner and outer sleeves define an annular space therebetween adapted to receive the end of the pipe 42 in a loose fit inside the outer sleeve and outside the inner sleeve. The coupling unit also includes a fastening means in the form of a bolt 60 with a head 62 and a shank extending through an opening in the deformation 58 outwardly through an opening in the outer sleeve 52. A washer 64 having a cross sectional configuration conforming to the cross sectional shape of the deformation 58 is disposed over the shank of the bolt 60 and the fastening means is completed by a nut 66 on the outer end of the bolt. The end of the pipe 42 is suitably provided with a notch 68 aligned with the shank of the bolt 60 and adapted to receive the same when the pipe is inserted into the coupling unit 40.

The coupling or joint of the pipe 42 with the muffler 44 is completed by tightening of the nut 66 on the bolt 60 to the desired value of torque or tension in the bolt shank, to achieve the desired degree of engagement or clamping of the pipe in the coupling unit. Tightening of the nut 66 is effective to enlarge the inner sleeve 54 and contract the outer sleeve 52 in the same manner as described above with reference to the coupling unit of FIG. 1. In the resultant joint, the end of the pipe 42 is squeezed or gripped between the inner and outer sleeves, with the outer sleeve being stretched around the end of the pipe 42 and the inner sleeve being held in compressional stress against the reaction of the end of the pipe 42. Consequently the end of the pipe 42 is held in radial compression. The coupling unit thus provides close fitting engagement of the end of the pipe with the sleeves over a wide band commensurate with the length of the washer 64 which assures a good fluid seal and a mechanically strong joint.

Although the description of this invention has been given with reference to a particular embodiment, it is not to be construed in a limiting sense. Many variations and modifications will now occur to those skilled in the art. For a definition of the invention reference is made to the appended claims.

The embodiments of the present invention in which an exclusive property or privilege is claimed are defined as follows:

1. A coupling device for pipes comprising an outer sleeve, an inner sleeve disposed inside the outer sleeve and defining an annular opening therebetween at one end thereof, at least said inner sleeve being made of an ordinarily resilient and deformable material, said opening being adapted to receive the end of a pipe, said inner sleeve including an inwardly extending deformation adjacent said one end thereof, and tensioned fastener means extending through said outer sleeve and through said deformation whereby said inner sleeve will be expanded radially and the wall of a pipe end inserted in said opening will be squeezed between said sleeves.

2. The invention as defined in claim 1 wherein said sleeves also define a second annular opening therebetween at the other end thereof, said inner sleeve including an inwardly extending deformation extending from one end thereof to the other, said second annular opening being adapted to receive the end of another pipe.

3. The invention as defined in claim 2 including support means disposed between said sleeves at a location intermediate the ends thereof for holding the ends of said sleeves in spaced relation.

4. The invention as defined in claim 2 including an axially elongated washer disposed on the outside of said outer sleeve, and wherein said fastener means comprises a pair of axially spaced bolts with shanks extending through said sleeves and said washer in a radial direction.

5. The invention as defined in claim 1 wherein said outer sleeve is circular in cross section and said inner sleeve is also circular in cross section except for an inwardly extending deformation.

6. The invention as defined in claim 1 wherein said sleeves are formed of steel pipe.

7. A coupling comprising an outer sleeve, an inner sleeve disposed inside the outer sleeve and defining an annular opening therebetween at each end thereof, the annular opening at each end being adapted to receive the end of a pipe, at least said inner sleeve being made of an ordinarily resilient and deformable material said inner sleeve including an inward deformation extending from one end to the other and being approximately the same length as the outer sleeve, support means disposed between the inner and outer pipes for holding them in spaced, coaxial relation, a first pipe having an end of circular cross-section inserted in one of the annular openings, a second pipe having an end of circular cross-section inserted in the other one of the annular openings, and tensioned fastener means extending through said outer sleeve and through said deformation whereby said inner sleeve will be expanded radially and the walls of said first and second pipes will be squeezed between the sleeves by said tension.

8. The invention as defined in claim 1 wherein said fastener means is a pair of axially spaced bolts.

9. The invention as defined in claim 8 including an elongated washer disposed over said bolts on the outer surface of the outer sleeve and having a cross sectional configuration conforming to the cross sectional configuration of said deformation in the inner sleeve.

10. The invention as defined in claim 9 wherein the outer sleeve is circular in cross section and said inner sleeve is circular in cross section except for said deformation.

11. The invention as defined in claim 9 wherein said support means is comprised of oppositely disposed protuberances on the inner wall of said outer sleeve in engagement with the outer wall of said inner sleeve.

* * * * *